United States Patent [19]

Schmid

[11] Patent Number: 5,373,631
[45] Date of Patent: Dec. 20, 1994

[54] METHOD FOR MACHINING A RADIALLY SYMMETRICAL WORKPIECE SURFACE AND A TOOL FOR PERFORMING THE METHOD

[75] Inventor: Karlheinz Schmid, Nürtingen, Germany

[73] Assignee: Gebr. Heller Maschinenfabrik GmbH, Nürtingen, Germany

[21] Appl. No.: 969,016

[22] Filed: Oct. 30, 1992

[30] Foreign Application Priority Data

Oct. 30, 1991 [DE] Germany .............. 4135681

[51] Int. Cl.⁵ .................. B23B 5/18; B23C 3/04
[52] U.S. Cl. .................. 29/888.08; 29/6.01; 82/106; 82/159; 407/12; 407/58; 407/61
[58] Field of Search ........... 82/1.11, 106, 107, 108, 82/109, 159; 29/6.01, 56.5, 888.08; 51/237 CS, 73 GC, 289 R; 407/12, 14, 18, 51, 55, 56, 58, 60, 61

[56] References Cited

U.S. PATENT DOCUMENTS

| | | | |
|---|---|---|---|
| Re. 30,908 | 4/1982 | Friedline et al. | 407/61 |
| 1,550,914 | 8/1925 | Melling | 51/73 GC |
| 3,590,469 | 7/1971 | Rohs | 29/6.01 |
| 3,701,187 | 10/1972 | Erkfritz | 407/58 |
| 3,832,919 | 9/1974 | Jacobi et al. | 82/106 |
| 3,875,631 | 4/1975 | Malinchak | 407/61 |
| 4,242,020 | 12/1980 | Schmid | 82/106 |
| 4,433,948 | 2/1984 | Kodama | 407/58 |
| 4,603,514 | 8/1986 | Suzuki et al. | 51/289 R |
| 4,794,665 | 1/1989 | Peters | 407/58 |

FOREIGN PATENT DOCUMENTS

| | | | |
|---|---|---|---|
| 0211216 | 6/1986 | European Pat. Off. | |
| 2431897 | 3/1980 | France | 407/114 |
| 2627984 | 12/1977 | Germany | 51/289 R |
| 3523274 | 6/1985 | Germany | |

Primary Examiner—William E. Terrell
Attorney, Agent, or Firm—Robert W. Becker & Associates

[57] ABSTRACT

A method for machining a rotation-symmetrical workpiece surface includes the steps of rotating the workpiece during machining, roughing the workpiece surface, smoothing in a longitudinal turning process the workpiece surface with a cutting tool having a cutting blade with a divided edge arrangement, advancing the cutting tool in a radial direction relative to the workpiece surface in the smoothing step, and moving the cutting tool in the axial direction of the workpiece surface for carrying out the longitudinal turning process. The cutting tool for carrying out the aforementioned method comprises at least one first cutting blade for the smoothing step, the first cutting blade having at least two adjacent edges axially spaced at a distance from one another.

8 Claims, 4 Drawing Sheets

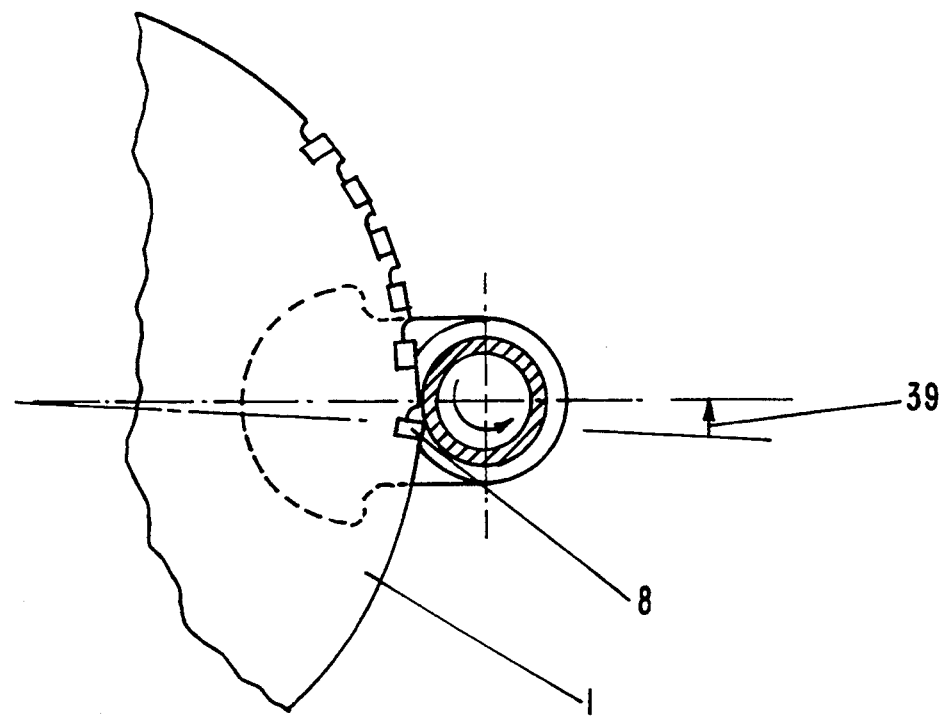
FIG—6a
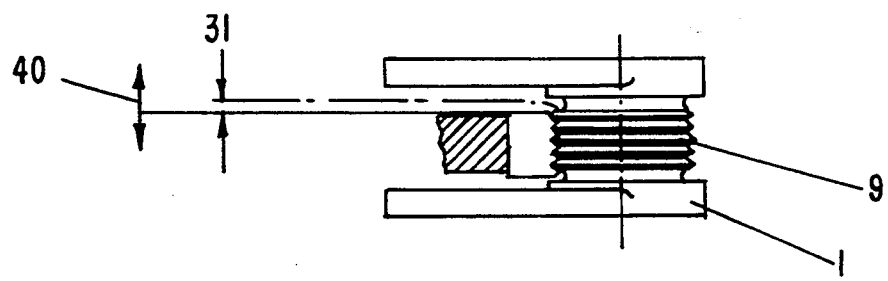
FIG—6b
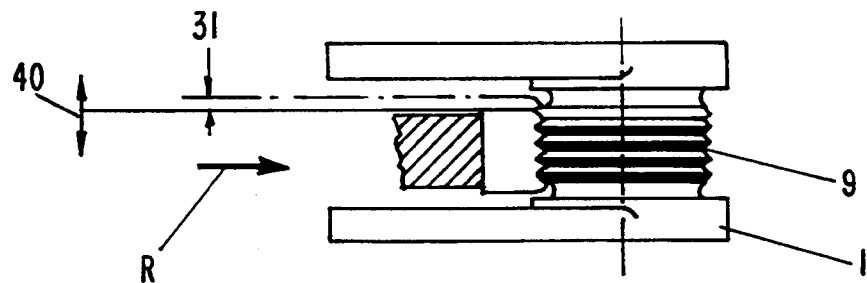
FIG—7

METHOD FOR MACHINING A RADIALLY SYMMETRICAL WORKPIECE SURFACE AND A TOOL FOR PERFORMING THE METHOD

BACKGROUND OF THE INVENTION

The present invention relates to a method for machining a rotation-symmetrical workpiece surface, especially of crankshafts, wherein the workpiece is rotated during machining and the workpiece surface is first roughed and then smoothed with a cutting blade. The present invention further relates to a tool for performing the aforedescribed method.

In the machining of crankshafts it is known from European patent 0 211 216 and German Offenlegungsschrift 35 23 274 to perform a roughing process of the crankshaft by radially plunge-cutting by turning with a formed cutter. Subsequent to this roughing process, the finishing process of the crankshaft is performed by turning broaching in which the crankshaft is rotated at a relatively high speed while the disk-shaped tool is rotated at a relatively low speed. For each individual width of a crankshaft pin, special cutters for the turning broaching of the finishing process must be employed since the cutting edges extend at an angle relative to the axis of rotation of the tool and furthermore must be embodied in a dished fashion. During broaching turning the cutting edges penetrate at a very great negative angle into the crankshaft resulting in very high normal forces. This results in an increased wear at the cutting edges of the cutting elements and in an increased bending of the crankshaft during the turning broaching process. As a consequence, during broaching turning processes a rattling tendency is observed which leads to a reduced accuracy of the cutting process. Furthermore, during the machining of steel in a turning broaching process long, curled cuttings are produced which inhibit a reliable flow of cuttings within the tool and the machine. Especially with automated machines the removal of these long, curled cuttings is difficult and expensive. These long, curled cuttings furthermore differ considerably with variations of the excess material to be removed.

It is therefore an object of the present invention to provide a method of the aforementioned kind and a tool of the aforementioned kind with which the workpiece surface can be machined during the smoothing operation such that with low cutting material costs and a reliable cuttings removal a high precision at the workpiece surface may be achieved and only small cutting forces are generated.

BRIEF DESCRIPTION OF THE DRAWINGS

This object, and other objects and advantages of the present invention, will appear more clearly from the following specification in conjunction with the accompanying drawings, in which:

FIGS. 6a, 6b show respectively a cross-section and top view of tool and workpiece indicating the tangential and axial advancement of the tool; and FIG. 7 illustrates in a top view simultaneous radial advancement and reciprocation in the axial direction.

SUMMARY OF THE INVENTION

Figure 1:
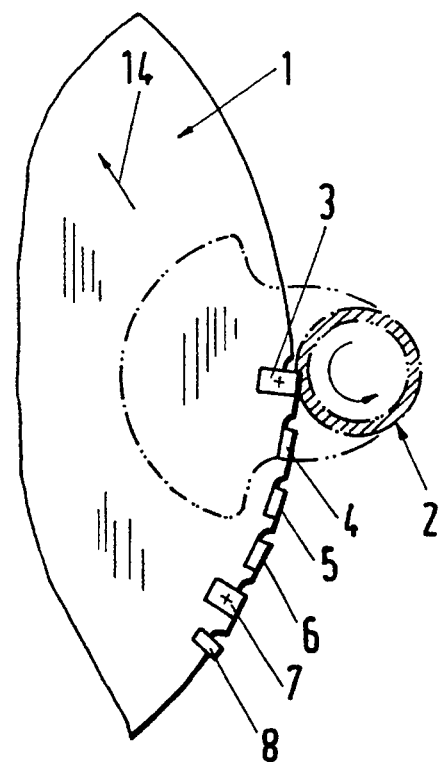
FIG. 1 shows a side view of a portion of the inventive tool which is disk-shaped.

The inventive method is primarily comprised of the following steps:
  rotating the workpiece during machining;
  roughing the workpiece surface;
  smoothing in a longitudinal turning process the workpiece surface with a cutting tool having a cutting blade with a divided edge arrangement;
  for the smoothing step, advancing the cutting tool in a radial direction relative to the workpiece surface; and,
  for carrying out the longitudinal turning process, moving the cutting tool in the axial direction of the workpiece surface.

Preferably, in the advancing step, the cutting tool is positioned at the workpiece surface at full removal depth, and the longitudinal turning process is subsequently performed. In the alternative, it is possible to position the cutting tool in the advancing step at the workpiece surface in stepped intervals until full removal depth is reached, whereby subsequent to each positioning at a stepped interval the longitudinal turning process is performed.

Advantageously, the method further comprises the step of reciprocating at least once the cutting blade in the axial direction of the workpiece surface during the longitudinal turning process.

The inventive method may further comprise the steps of continuously radially advancing the cutting tool and simultaneously reciprocating the cutting tool in the axial direction of the workpiece surface during the longitudinal turning process. In an alternative, the cutting tool may be pivoted in a tangential direction toward the workpiece surface and reciprocated in the axial direction of the workpiece surface during the longitudinal turning process.

Preferably, the step of roughing of the workpiece surface is carried out by plunge-cutting, or, in the alternative, by milling.

The cutting tool for machining a rotation-symmetrical workpiece according to the inventive method is primarily comprised of at least one first cutting blade for the smoothing step, the first cutting blade having at least two adjacent edges axially spaced at a distance from one another. Preferably, the edges are arranged in a common plane. Advantageously, the first cutting blade comprises a plurality of edges, the edges having approximately a triangular shape.

Expediently, the edges each have a cutting edge with a leading surface and lateral surfaces continuing from the cutting edge and extending from the leading surface, the lateral surface being formed as free surfaces.

Preferably, the distance between the edges is smaller than the axial movement of the cutting tool during the smoothing step.

The tool preferably comprises two of the first cutting blades arranged adjacent to one another, each first cutting blade having at least two of the adjacent edges axially spaced at a distance from one another. Expediently, the first cutting blades are staggered one behind another. Preferably, the first cutting blades have overlapping working areas.

The cutting tool may be disk-shaped and the first cutting blades are distributed over the circumference of the disk-shaped cutting tool. Preferably, the tool further comprises second cutting blades for the roughing step connected at the circumference of the cutting tool. The first cutting blades and the second cutting blades form a cutting blade arrangement, with the cutting tool having a plurality of such cutting blade arrangements.

According to the inventive method, the workpiece surface is machined in a longitudinal turning process during the smoothing operation. This is advantageous because the edges of the cutting blades must not change their position relative to the workpiece surface during the smoothing operation and can be arranged such that only minimal forces are generated. The edges are therefore only subject to minimal wear and the workpiece is only slightly bent. Accordingly, a rattling tendency during the smoothing operation is prevented so that a high machining precision is achieved. The cutting blades with their divided edge arrangement is reciprocated during the longitudinal turning process only along short axial pathways whereby with each edge, since they must not be moved over the entire axial length of the rotating workpiece surface to be machined, only short cuttings are generated. These short cuttings are easily removed. When the longitudinal turning process is the final working step during the smoothing operation, the workpiece can then be electrically returned into its initial position so that subsequently by reciprocating the cutting blade the respective rotational surface can be machined by the edges to achieve the required final dimensions. In this manner, a high rotary precision of the rotational surface is achieved. With the inventive method and the inventive tool crankshafts, as well as camshafts, drive shafts, and other rotation-symmetrical workpiece surfaces, may be machined in a smoothing operation.

DESCRIPTION OF PREFERRED EMBODIMENTS

The present invention will now be described in detail with the aid of several specific embodiments, utilizing FIGS. 1 through 5.

The tool 1 which in its preferred embodiment is disk-shaped is suitable for roughing and smoothing crankshafts 2. The roughing step for the crankshaft is preferably performed by plunge-cutting and the smoothing step by longitudinal turning.

Figure 2:
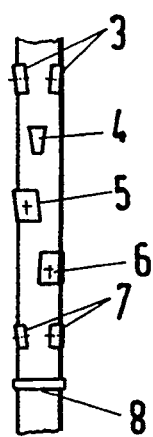
FIG. 2 is a developed projection of the edge arrangement of the tool according to FIG. 1.

FIGS. 1 and 2 show an examplary portion of the tool 1. At the circumference of the tool the cutting blades 3 to 8 are arranged one after another in the circumferential direction. The cutting blades 3 to 8 serve to perform different machining steps at the crankshaft 2. With the cutting blades 3 to 6 the roughing process is performed, while with the cutting blades 7 and 8 the smoothing step is performed. The cutting blades 3 to 8 form a cutting blade arrangement. The circumference of the disk-shaped tool 1 is provided with a plurality of such cutting blade arrangements so that the tool 1 can provide a long service life.

Figure 3:
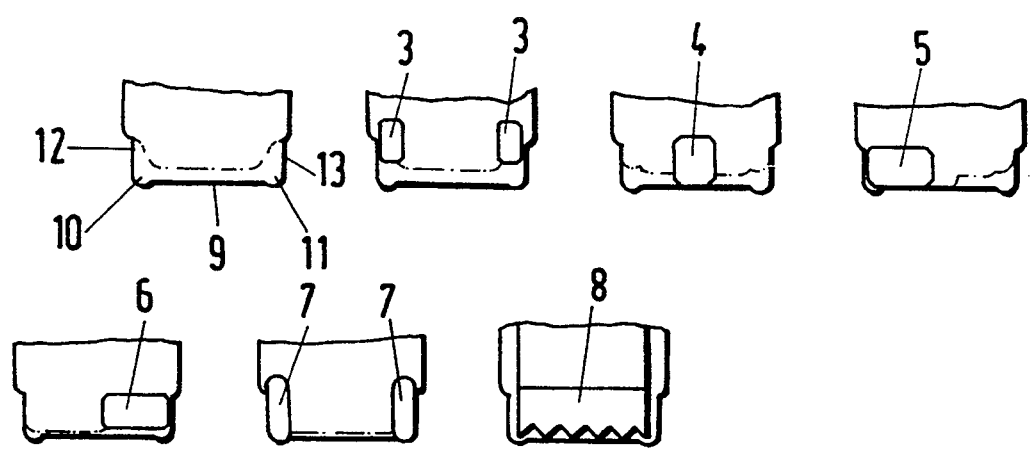
FIG. 3 is a schematic representation of the machining of a crankshaft pin which is being smoothed with the inventive tool.

As an example, in FIG. 3 the machining of a crankshaft 2 by a longitudinal turning process with individual cutting blades 3 to 8 is represented. The crankshaft 2 is rotated during the machining about the respective axis of the cylindrical surface to be machined. The circumferential surface of a crankshaft pin 9 of the crankshaft 2 is schematically represented in the drawing as well as the adjacently arranged collars 12 and 13. In the left upper representation of FIG. 3 the rough contour of the crankshaft pin 9 is represented in a dash-dotted line. In a first plunge-cutting process the crankshaft 2 is machined until the shape corresponding to the solid line in FIG. 3 is achieved. Subsequently, the cutting blades 3 which are arranged at the lateral surfaces of the disk-shaped tool 1 are used to machine the ends (collars) 12, 13 of the crankshaft pin 9. After completion of this first turning operation the tool 1 is radially removed, then turned in the direction of arrow 14 (FIG. 1) and again radially advanced to the crankshaft 2. Now the central portion of the crankshaft pin 9 is roughed with the cutting blade 4, whereby the tool 1 is stationary and the crankshaft 2 is rotated.

After completion of this second turning operation the tool 1 is again radially removed from the crankshaft 2, then rotated in direction of arrow 14 and again advanced to the crankshaft 2. In this manner, the cutting blades 5 to 7 are subsequently engaged with the crankshaft 2 (FIG. 3). With the cutting blades 5 and 6 the crankshaft pin 9 is roughed over its entire length to approximately its final diameter.

In a further turning operation the cutting blades 7 engage with the crankshaft 2. They are arranged opposite one another or staggered relative to one another at the lateral surfaces of the disk-shaped tool 1 (FIG. 2). With the cutting blades 7 the collars 12 and 13 at the transition of the crankshaft pin 9 to the lateral webs are machined, and, if necessary, also the recesses 10 and 11.

After these various turning operations with the cutting blades 3 to 7 the crankshaft pin 9 has almost reached its final shape. Only the smoothing step by longitudinal turning with the cutting blade 8 is left.

Figure 4:
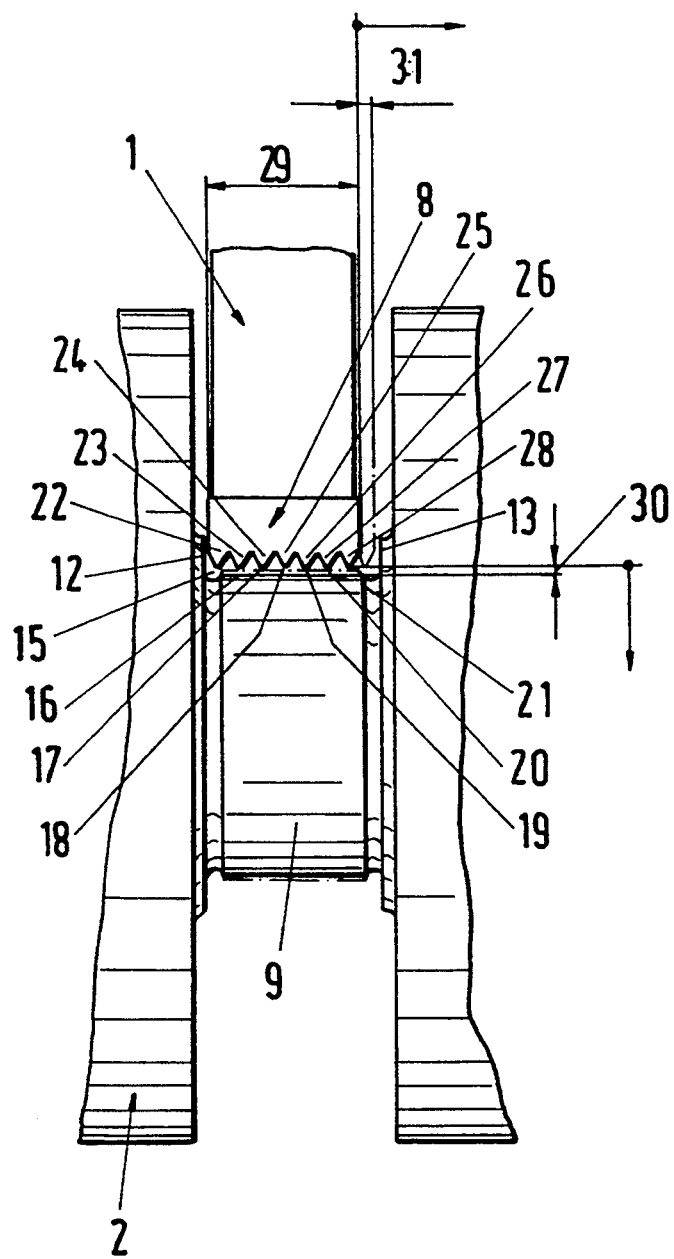
FIG. 4 is a schematic representation of a plan view transverse to the axis of the crankshaft pin, showing the inventive tool engaging the crankshaft.

As can be seen in FIG. 4, the cutting blade 8 is provided with edges 22 to 28 (divided edge arrangement; i.e., not a continuous edge) which are spaced axially from one another at a distance and which are arranged in a common axial plane of the tool 1. The edges 22 to 28 are of a triangular shape when viewed transverse to the rotational axis of the tool 1 and have each a cutting tip 15 to 21. The side faces of each edge 22 to 28 which are converging in the direction of the respective cutting edge are embodied as free surfaces, i.e., the cutting edges have rake. This means that they extend from the respective end face of each cutting edge at a slant.

As can be seen further from FIG. 4 the axial width of the cutting blade 8 is smaller than the length of the crankshaft pin 9 to be machined when measured between the collars 12 and 13. In order to be able to smooth the entire circumferential surface of the crankshaft pin 9 with the cutting blade 8, the tool 1 is moved at least once in the axial direction of the crankshaft pin 9 such that the mantle surface of the crankshaft pin is smoothed by the edges 22 to 28 over its entire axial length.

During the smoothing operation, during which the crankshaft 2 is, of course, rotated at the cutting velocity, three movements of the cutting tool 1 are possible. First, the tool 1 can be radially advanced in the direction toward the crankshaft 2 in a single advancement movement until the full depth of removal is reached. The tool 1, in the position shown in FIG. 4, is advanced radially relative to the crankshaft pin 9. Subsequently, the tool 1 is moved from its position according to FIG. 4 axially to the right so that at the mantle surface of the crankshaft pin 9 the excess amount of material 30 is removed by the edges 22 to 28 of the cutting blade 8. This machining step can be considered a longitudinal turning process. The axial movement of the tool 1 is indicated at 31 in FIG. 4. This axial displacement is slightly greater than the distance between adjacent edges 22 to 28 so that it is ensured that during this axial displacement the outer mantle surface of the crankshaft pin is completely machined. Since the tool 1 is advanced radially to the full depth (i.e., to the position corresponding to the complete removal of excess material) and is then only moved once in the axial direction of the crankshaft pin 9, this smoothing operation can be performed within a very short period of time. However, the load exerted on the crankshaft 2 during this operating mode is slightly greater than in the following two processes.

Figure 5:
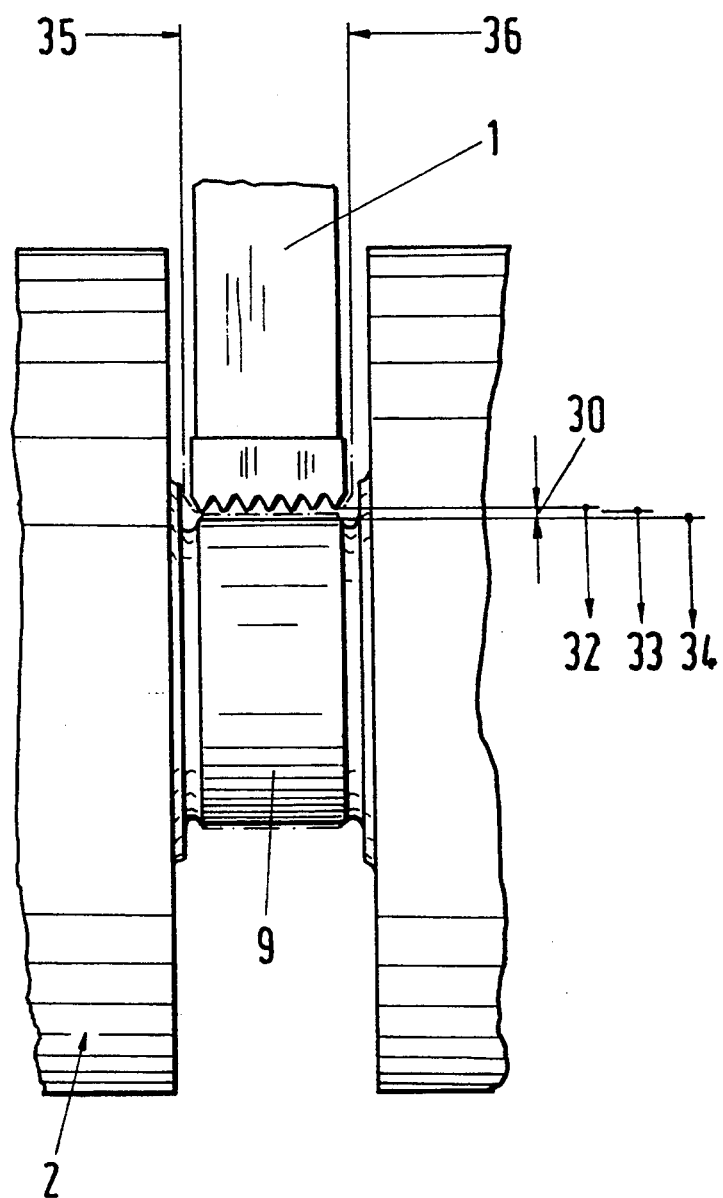
FIG. 5 is a representation according to FIG. 4 in which the inventive tool is shown in an intermediate position of machining of the crankshaft pin.

In an alternative process, the tool 1 is radially advanced toward the crankshaft pin 9 in stepped intervals until the full removal depth has been reached. The different radially stepped intervals 32 to 34, are shown in FIG. 5. FIG. 5 shows the tool 1 in an axial intermediate position. After each radial stepped interval 32 to 34 the tool 1 is moved in the axial direction relative to the crankshaft pin 9 from its initial position. The two different possible initial positions of the tool 1 are shown in FIG. 5 at 35 and 36. From the initial position 35 the tool 1 is moved into the end position 36 after the first radially stepped interval 32 (FIG. 5) while the crankshaft 2 is rotated. During this axial advancement the mantle surface of the crankshaft pin 9 is completely machined by the edges 22 to 28. As soon as the end position 36 has been reached, the tool 1 is again radially advanced into the stepped interval position 33 and the tool 1 is now axially moved to the left, as can be seen in FIG. 5. In this second step the mantle surface of the crankshaft pin 9 is again completely machined by the edges 22 to 28. Finally, the tool 1, when its initial position 35 has been reached again, is radially advanced (stepped interval 34) and is again axially moved to the left into the end position 36 (FIG. 5). With the three radially stepped intervals 32 to 34 in connection with the respective subsequent longitudinal turning process the excess amount of material 30 has again been removed from the crankshaft pin 9. Since the radial advancement to the desired removal depth is achieved in individual steps (stepped intervals) whereby after each radially stepped interval the aforedescribed individual longitudinal turning step occurs, the crankshaft 2 is exposed to a much reduced load during this smoothing operation as compared to the aforedescribed method. However, this second method requires a longer machining time. Of course, it is possible to perform the above described method with more than three or with only two stepped intervals depending on the amount of material to be removed from the crankshaft pin 9.

In a third method (see FIG. 7) for the smoothing operation the tool 1 is continuously radially advanced (arrow R) toward the rotating crankshaft 2. This continuous radial advancement is superimposed by a reciprocating longitudinal movement (arrow 40) of the cutting blade 8 (respectively of the cutting tool 1). After the excess amount of material 30 has been removed from the crankshaft pin 9, at least one more axial displacement of the cutting tool 1 takes place. Preferably, a plurality of such axial tool displacements are performed in order to achieve a high machining precision. The crankshaft 2 is elastically bent during the smoothing operation for removal of the excess amount of material 30. During the final axial reciprocating movement of the tool 1 the crank shaft 2 may elastically return into its initial position and the edges 22 to 28 can machine the crankshaft pin 9 to its final dimensions during these axial reciprocating movements of the tool 1. With these reciprocating movements a very high rotary machining precision of the crankshaft pin 9 is possible.

The tool 1 is also suitable to machine or smooth hardened workpieces.

The cutting blade 8 may be made from any known cutting tool material, especially from hard metals, from coated hard metals, ceramic, Cermet, CBN, etc.

In the represented embodiment the tool 1 is diskshaped. It is thus possible to provide a plurality of cutting blade arrangements at the circumference of the tool 1 so that such a tool guaranties a long service life. If it is desired to design the tool exclusively for smoothing crankshafts 2, the tool may also be constructed as a single purpose tool, i.e., only with a corresponding number of identical smoothing cutting blades.

The cutting blade 8, in the simplest design, has only two edges. Expediently, the cutting blade 8 is provided with a plurality of edges. In the shown and described embodiment the cutting blade 8 is provided with seven edges 22 to 28.

For longer shaft sections it is also possible to provide two cutting blades 8 positioned adjacent to one another at the cutting tool 1 whereby each cutting blade 8 is provided in the aforedescribed manner with edges spaced at a distance from one another. The two cutting blades in this case are arranged staggered one behind another so that first one cutting blade is used to machine the workpiece and subsequently the other cutting blade is used after a respective position adjustment. With such a tool design the advancement of the tool 1 may be possible in two different manners. When the tool 1 is radially advanced toward the crankshaft 2 the tool is then reciprocated with each of the two cutting blades in the axial direction. However, in this case, positioning inaccuracies of the tool carriage result in machining inaccuracies. Such positioning inaccuracies of the tool carriage may result in the crankshaft pin 9 having two different diameters within each working area of the respective cutting blade.

Such machining imprecisions may be avoided when the tool 1 with two cutting blades 8 is pivoted tangentially (transverse) to the axis of the crankshaft 2, respectively, the crankshaft pin 9 (see FIGS. 6a and 6b). With the tool 1 and the respective cutting blade 8 an axial reciprocation in the (axial) direction of arrow 40 within the range indicated at 31 is performed in the aforementioned manner in order to smooth the respective circumferential areas of the crankshaft pin 9. With this tangential pivoting movement (arrow 39 in FIG. 6a) no positioning inaccuracy occur so that the areas of the mantle surface of the crankshaft pin 9 machined by the two cutting blades 8 have exactly the same diameter.

The two cutting blades 8 are provided at the tool 1 such that they have overlapping working areas so that the crankshaft pin 9 is machined over its entire length.

The cutting blade 8 of the tool 1 represented in FIGS. 1 to 5 is embodied such that in its initial position (FIG. 4) one edge 22 at the first end face is positioned axially outwardly of the mantle surface of the crankshaft pin 9 to be machined while the oppositely arranged edge 28 at the other end face is positioned at the mantle surface of the crankshaft pin at a distance from the neighboring end face of the pin (FIG. 4). The axial displacement 31 of the tool 1 is so great that the edge 22 during the axial displacement enters the machining area of the edge 23 while the edge 28 is moved past the corresponding end face of the crankshaft pin 9, as indicated in a dash-dotted line in FIG. 4. In this manner it is ensured that the mantle surface of the crankshaft pin 9 is completely smoothed.

The present invention is, of course, in no way restricted to the specific disclosure of the specification and drawings, but also encompasses any modifications within the scope of the appended claims.

What I claim is:

1. A method for machining a radially symmetrical workpiece surface, comprising the steps of:
   rotating a workpiece during machining;
   roughing the workpiece surface;
   smoothing in a longitudinal turning process the workpiece surface with a cutting tool having a cutting blade with a divided edge arrangement;
   for said smoothing step, advancing the cutting tool in a radial direction relative to the workpiece surface into a smoothing position and, in said smoothing position, moving the cutting tool in an axial direction of the workpiece surface.

2. A method according to claim 1, further comprising the step of:
   in said advancing step, positioning the cutting tool at the workpiece surface at full removal depth.

3. A method according to claim 1, further comprising the step of:
   in said advancing step, radially advancing the cutting tool in stepped intervals until full removal depth is reached and, subsequent to each advancing at a stepped interval, performing said step of moving the cutting tool in an axial direction of the workpiece surface.

4. A method according to claim 1, further comprising the step of:
   reciprocating at least once the cutting tool in said axial direction of the workpiece surface during said longitudinal turning process.

5. A method according to claim 1, wherein said step of advancing includes the step of continuously radially advancing the cutting tool and wherein said step of moving the cutting tool in an axial direction of the workpiece surface includes the step of simultaneously to said step of continuously radially advancing reciprocating the cutting tool in said axial direction of said workpiece surface.

6. A method according to claim 1, further comprising the steps of pivoting the cutting tool in a tangential direction relative to an axis of the workpiece toward the workpiece surface and reciprocating the cutting tool in said axial direction of said workpiece surface during said step of moving the cutting tool in an axial direction of the workpiece surface.

7. A method according to claim 1, wherein said step of roughing of the workpiece surface is carried out by plunge-cutting.

8. A method according to claim 1, wherein said step of roughing of the workpiece surface is carried out by milling.

* * * * *